United States Patent [19]
Zingaro et al.

[11] 4,084,089
[45] Apr. 11, 1978

[54] LONG WAVE-LENGTH X-RAY DIFFRACTION CRYSTAL AND METHOD OF MANUFACTURING THE SAME

[75] Inventors: William P. Zingaro, Hartsdale; Albert Sicignano, Mt. Kisco, both of, NY

[73] Assignee: North American Philips Corporation, New York, N.Y.

[21] Appl. No.: 755,683

[22] Filed: Dec. 20, 1976

[51] Int. Cl.$^2$ ............................................. G01N 23/20
[52] U.S. Cl. .................................................. 250/272
[58] Field of Search ............................. 250/272–276, 250/280; 156/DIG. 85

[56] References Cited
U.S. PATENT DOCUMENTS 3,518,427  6/1970  Cotterill ................. 250/276
3,591,803  7/1971  Spielberg ................ 250/276 X

*Primary Examiner*—Davis L. Willis
*Attorney, Agent, or Firm*—Frank R. Trifari; Carl P. Steinhauser

[57] ABSTRACT

An x-ray diffraction crystal for the analysis of x-rays having a wave-length of 50 Angstroms or greater comprising at least two insoluble monolayers of fatty acids in the form of metal soaps, separated by monolayer pairs of differing metal cation - metal soap or non-cation soaps.

Such crystals are formed by alternately raising and lowering a solid substrate through the monolayer-covered liquid surfaces of a bivalent heavy element cation and a bivalent light element cation or cation deleted monolayer.

4 Claims, 3 Drawing Figures

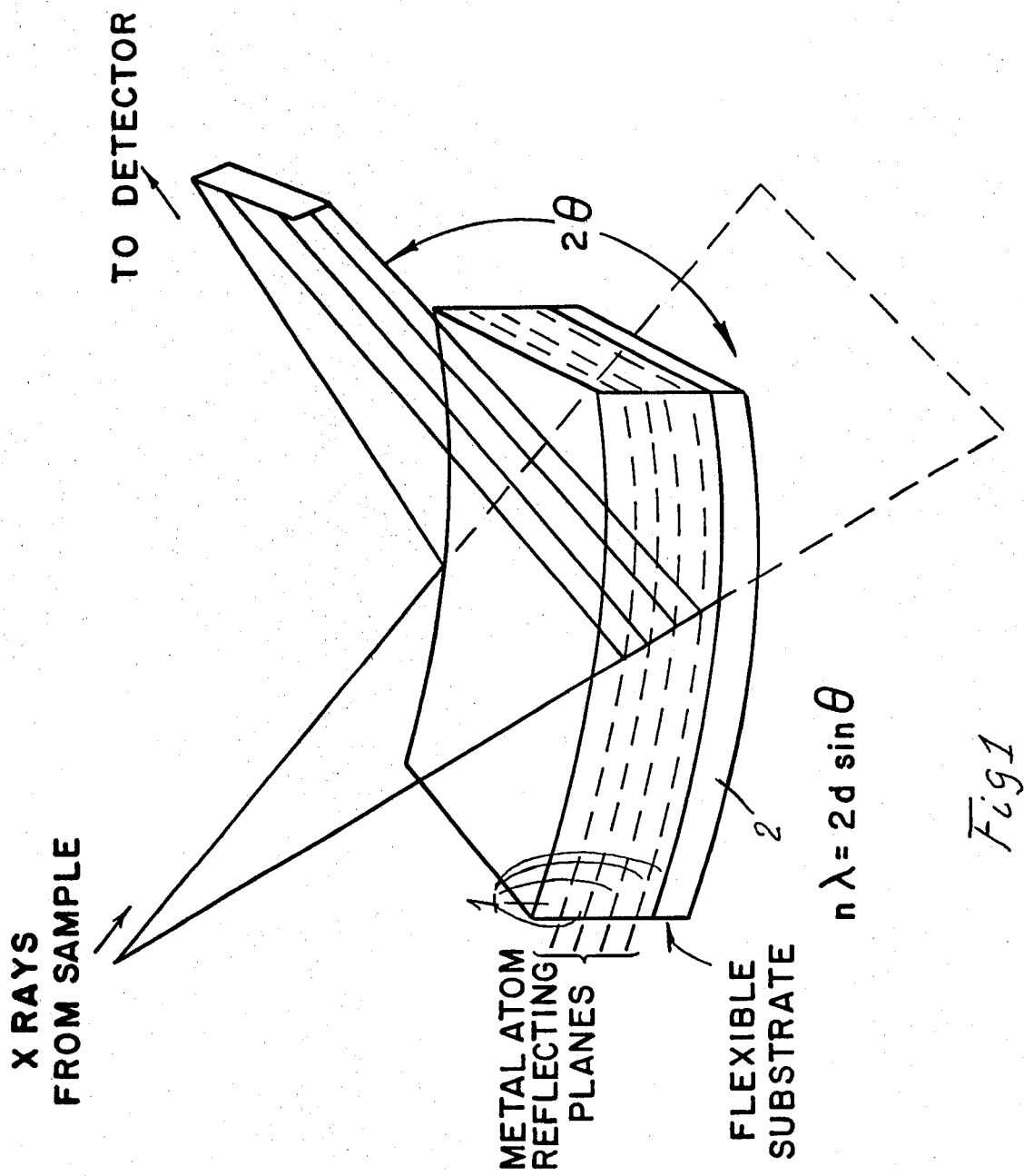

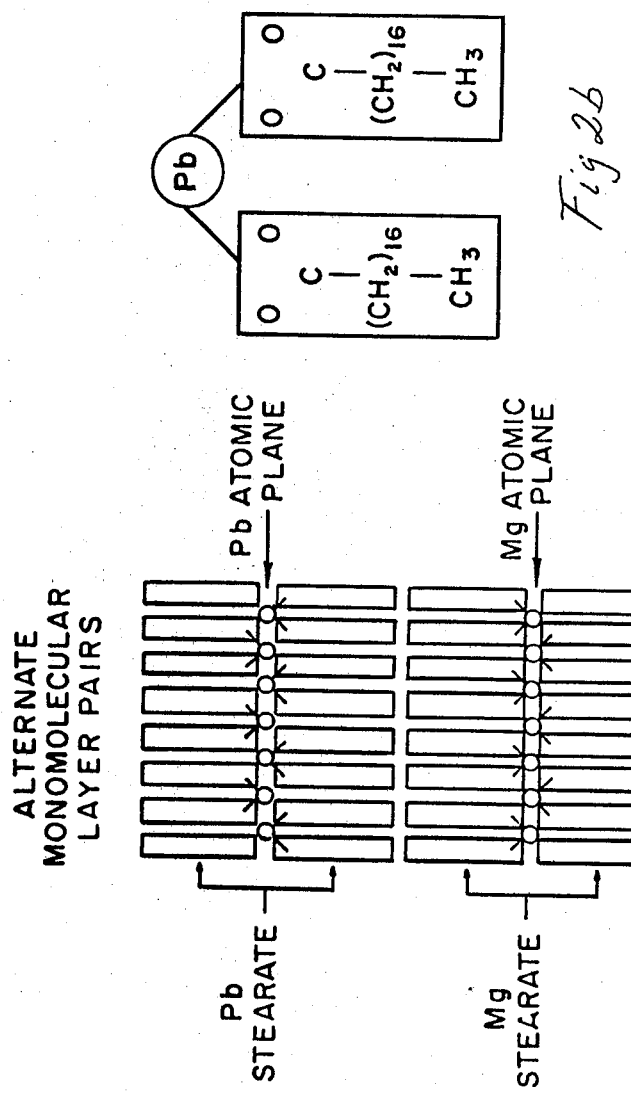

LONG WAVE-LENGTH X-RAY DIFFRACTION CRYSTAL AND METHOD OF MANUFACTURING THE SAME

This invention relates to an x-ray diffraction crystal for analyzing long wave-length x-rays, i.e., x-rays having a wave-length of at least 50 Angstroms, and to a method of making such crystals.

X-rays having wave-lengths greater than about 10A are generally known as soft x-rays and are detected using a wave-length dispersive spectrometer with a crystal as a dispersive element. X-ray spectroscope below 1 keV would allow identification of elements with atomic numbers below 10 and surface analysis at a depth of 10 - 1,000A since soft x-ray photons occur below 1 keV, or wave-lengths greater than 12.4A.

Langmuir-Blodgett multi-layer pseudo crystals are generally used as a dispersive element. Each layer is a mono-molecular layer of a heavy metal soap. The distance between the heavy metals is determined by the chain length of the fatty acid. The distance determines the maximum x-ray wave-length which can be resolved. The heavy metal, i.e. the cation, determines the intensity of the diffracted radiation and is directly related to the atomic number of the cation.

The most commonly used pseudocrystal is lead stearate with a 2d (d being the interplanar distance) spacing equal to 100A. Longer "d" spacing crystals using lignoceric acid, and the like can be made but are extremely difficult to build.

It is a principal object of this invention to provide a new, multilayer Longmuir-Blodgett crystal capable of diffracting x-rays of at least twice the wave-length of state of the art crystals.

It is another object of the invention to provide a method of making multilayer Langmuir-Blodgett crystals capable of diffracting x-rays of at least twice the wave-length compared to the state of the art crystals.

These and further objects of the invention will appear as the specification progresses.

In accordance with the invention the crystal consists of a pair of alternate monolayers of a metal soap and a light metal soap. Selecting cations with significant difference in atomic number and dispersing power such as Pb and Be, Mg, Ca, etc., increases the effective 2d spacing of the crystal since the Pb planes cause the predominant x-ray diffraction. The (sequence of the) layer pairs between the heavy element pairs gives the 2d spacing. Thus, $$2d = 100A + N(100A); N = 1, 2, 3, \ldots$$

where $N$ represents the number of layer pairs sequentially placed between the heavy metal soap layer pairs.

Preferably, the heavy metal soap is a lead salt of a fatty acid such as lead stearate, and the light metal soap is beryllium or magnesium stearate, or calcium stearate.

These crystals are built up in accordance with the invention by depositing in the desired pattern on a solid substrate, monomolecular layers of Pb-stearate and layers of a low atomic number metal stearate. Thus, stearic acid in a n-hexane solution is placed on the surface of a water solution containing the metal cation. After the n-hexane evaporates, a surface monolayer of the metal stearate is formed. Subsequently, a floating barrier under sufficient surface pressure is applied to the monomolecular layer causing the molecules to come together. Substrates, e.g., glass, are mounted vertical to the liquid and dipped into and lifted out of the liquid at a constant rate transferring monomolecular layers on to the substrates in the desired pattern.

The invention will be described in greater detail with reference to the accompanying drawing:

FIG. 1, shows a Langmuir-Blodgett pseudo crystal used for reflecting x-rays to a detector;

FIG. 2a, shows in greater detail the structure of the crystal;

FIG. 2b, shows the molecular structure of lead stearate.

In FIG. 1, the Langmuir-Blodgett crystal comprises several metal atom reflecting planes 1 supported by a glass substrate 2 as shown. The metal atom reflecting planes are alternate layers of Pb-stearate, the molecular structure of which is shown in FIG. 2b, separated by layers of Mg-stearate (see FIG. 2a).

X-rays from a sample (not shown) excited to fluoresce either by electron beam or x-rays and emit secondary x-rays characteristic of the elements composing the speciment are reflected by the crystal 1 in accordance with Bragg's relationship $$n\lambda = 2d \sin \theta$$

where $n$ is the number of reflecting planes, $\lambda$ the wave-length of the incident x-rays, $d$ the interplanar spacing, and $\theta$ the angle of incidence and reflection of the x-rays.

Since $d$ is fixed, the angle $\theta$ will vary directly in response to wave-length and thus by positioning the detector and measuring the angle $\theta$, the wave-length, and hence the identity of an element can be determined.

What is claimed is:

1. An x-ray diffracting crystal comprising a plurality of insoluble monolayer pairs of a heavy metal soap separated by insoluble monolayer pairs of a lighter metal soap.

2. An x-ray diffracting crystal as claimed in claim 1 wherein the light metal is a divalent metal of lower atomic number than the heavy metal.

3. An x-ray diffracting crystal as claimed in claim 2 wherein the divalent metal is beryllium.

4. An x-ray diffracting crystal as claimed in claim 2 wherein the divalent metal is magnesium.

* * * * *